US011237058B2

(12) United States Patent
Benwadih et al.

(10) Patent No.: US 11,237,058 B2
(45) Date of Patent: Feb. 1, 2022

(54) THERMAL PATTERN SENSOR WITH PYROELECTRIC CAPACITANCE

(71) Applicant: COMMISSARIAT A L'ENERGIE ATOMIQUE ET AUX ENERGIES ALTERNATIVES, Paris (FR)

(72) Inventors: Mohammed Benwadih, Champigny sur Marne (FR); Amélie Revaux, Voiron (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 14 days.

(21) Appl. No.: 16/207,313

(22) Filed: Dec. 3, 2018

(65) Prior Publication Data

US 2019/0170587 A1 Jun. 6, 2019

(30) Foreign Application Priority Data

Dec. 4, 2017 (FR) ...................................... 1761602

(51) Int. Cl.
*G01J 5/10* (2006.01)
*G06K 9/00* (2006.01)
(Continued)

(52) U.S. Cl.
CPC ............... *G01J 5/10* (2013.01); *G01J 5/0025* (2013.01); *G01J 5/34* (2013.01); *G06K 9/0002* (2013.01)

(58) Field of Classification Search
CPC .. G01J 5/10; G01J 5/0025; G01J 5/35; G06K 9/0002
See application file for complete search history.

(56) References Cited

U.S. PATENT DOCUMENTS 4,394,773 A 7/1983 Ruell
4,429,413 A 1/1984 Edwards
(Continued)

FOREIGN PATENT DOCUMENTS

EP 2385486 A1 11/2011
EP 3129996 A1 2/2017
(Continued)

OTHER PUBLICATIONS

Fu et al. "Improving Dielectric Properties of PVDF Composites by Employing Surface Modified Strong Polarized BaTiO3 Particles Derived by Molten Salt Method" ACS Appl. Mater interfaces 2015, 7, p. 24480-24491 (Year: 2015).*

(Continued)

*Primary Examiner* — David P Porta
*Assistant Examiner* — Mamadou Faye
(74) *Attorney, Agent, or Firm* — Pearne & Gordon LLP

(57) ABSTRACT

Thermal pattern sensor comprising several pixels arranged on a substrate, each pixel including at least one pyroelectric capacitance formed by at least one portion of pyroelectric material arranged between at least one lower electrode and at least one upper electrode, with the lower electrode arranged between the substrate and the portion of pyroelectric material, and in which at least one protective dielectric layer is arranged between the portion of pyroelectric material and the upper electrode and comprises at least one of the following materials: fluoropolymer, self-assembled molecular monolayer, dielectric material soluble in a solvent orthogonal to the pyroelectric material.

15 Claims, 2 Drawing Sheets

(51) Int. Cl.
*G01J 5/00* (2006.01)
*G01J 5/34* (2006.01)

(56) References Cited

U.S. PATENT DOCUMENTS

| | | | | |
|---|---|---|---|---|
| 4,437,002 | A * | 3/1984 | Taniguchi | H01L 37/02 250/338.3 |
| 4,555,953 | A * | 12/1985 | Dario | G01L 1/16 310/338 |
| 6,289,114 | B1 | 9/2001 | Mainguet | |
| 10,036,734 | B2 * | 7/2018 | Fennell | G01N 29/22 |
| 2002/0081760 | A1 * | 6/2002 | Whatmore | G01J 5/02 438/25 |
| 2010/0135937 | A1 * | 6/2010 | O'Brien | A61K 8/02 424/59 |
| 2011/0286491 | A1 * | 11/2011 | Mainguet | G01J 5/024 374/1 |
| 2012/0236084 | A1 * | 9/2012 | Watanabe | B41J 2/14233 347/71 |
| 2014/0368583 | A1 * | 12/2014 | Morozumi | B41J 2/14201 347/68 |
| 2015/0357142 | A1 * | 12/2015 | Bulovic | H01L 45/00 200/181 |
| 2018/0145396 | A1 | 5/2018 | Benwadih et al. | |
| 2018/0155508 | A1 | 6/2018 | Benwadih et al. | |
| 2018/0254185 | A1 | 9/2018 | Benwadih et al. | |

FOREIGN PATENT DOCUMENTS

| | | |
|---|---|---|
| FR | 3044409 A1 | 6/2017 |
| WO | 2016/030755 A1 | 3/2016 |
| WO | 2017/093176 A1 | 6/2017 |

OTHER PUBLICATIONS

Simonson et al. "Formation and Stability of Self-Assembled Monolayers on Thin Films of Lead Zirconate Titanate (PZT)" Center for Micro-Engineered Ceramics, Department of Chemical and Nuclear Engineering, American Chemical Society, 1996, p. 2830-2836 (Year: 1996).*
Bao "Organic Materials for Thin Film Transistors" Material Matters 2007, p. 1-6. (Year: 2007).*
Preliminary French Search Report for Application No. FR 1761602, dated Aug. 1, 2018.
U.S. Appl. No. 16/207,614; entitled "Thermal Pattern Sensor with Pyroelectric Capacitor Comprising a Sol-gel Matrix and Metallic Oxide Particles", filed Dec. 3, 2018.
U.S. Appl. No. 16/207,846; entitled "Thermal Pattern Sensor with Pyroelectric Capacitor", filed Dec. 3, 2018.
U.S. Appl. No. 16/207,653; entitled "Thermal Pattern Sensor with Pyroelectric Capacitance and Hard Protective Layer", filed Dec. 3, 2018.
U.S. Appl. No. 16/186,926; entitled "Method for Producing a Stack of Layers for a Matrix Thermal Sensor", filed Nov. 12, 2018.

* cited by examiner

THERMAL PATTERN SENSOR WITH PYROELECTRIC CAPACITANCE

TECHNICAL FIELD AND PRIOR ART

The invention relates to a thermal pattern sensor exploiting the pyroelectric properties of a material, and advantageously forming a finger print sensor.

Finger print detection may be carried out by so-called "passive" sensors exploiting a difference in temperature between that of the finger and that of the sensor, as described in the documents U.S. Pat. Nos. 4,394,773, 4,429,413 and 6,289,114. At the ridges of the print, the skin of the finger is in direct physical contact with the sensor. A thermal transfer between the skin and the contact surface of the sensor takes place by conduction, which leads to a first temporal variation in temperature. At the valleys of the print, the skin of the finger is not in direct physical contact with the sensor. A thermal transfer between the skin and the contact surface of the sensor takes place through air, which is rather a heat insulator, which leads to a second temporal variation in temperature, less important. The difference between these two temporal variations in temperature is reflected by a difference between the signals measured by the pyroelectric capacitances, depending on whether they lie under a valley or under a ridge of the print. The image of the print then has a contrast that depends on this difference.

However, these sensors have the drawback of carrying out a measurement that depends uniquely on the difference between the temperature of the finger and the temperature of the sensor. Thus, after several seconds of contact between the finger and the sensor, the temperature of the finger and the temperature of the contact surface are homogenised, and it is no longer possible to obtain a satisfactory contrast. It may also happen that the level of the signal obtained is zero when the finger and the sensor are at the same temperature, or instead that the contrast of the captured images varies, which then poses problems during the later processing of the images obtained (for example, an inversion of the temperatures leads to an inversion of the image obtained).

Another type of sensor, of active type, offers a solution to this problem thanks to the addition of heating elements under the contact surface of the sensor. Such a sensor is described for example in the patent application EP 2 385 486 A1. The heating elements dissipate a certain amount of heat in each pixel of the sensor and the heating of the pixels is measured at the end of a certain time. The variation in temperature obtained is thus significant at the valleys of the print, where heat is transferred to the finger through air, and lower at the ridges of the print, where heat is transferred directly to the finger, by conduction. This leads to a lower final temperature in the case of a pixel in the presence of a ridge of the print, where heat is absorbed by the skin, compared to a pixel in the presence of a valley of the print where heat is rather conserved in the pixel. This makes it possible to improve and to conserve over time the contrast of an image acquired using said sensor.

The elements described above for finger print detection also apply to the detection of a thermal pattern other than a finger print, the element of which the thermal pattern to detect being arranged on the sensor during the measurement.

A thermal pattern sensor comprises thermal detection means which may be pyroelectric elements, diodes, thermistors or any other temperature sensitive element making it possible to convert a variation in temperature into a variation in potential or electric current.

More specifically, a pyroelectric type sensor comprises a matrix of pyroelectric capacitances arranged on a substrate, for example made of glass.

Each pyroelectric capacitance comprises a layer made of pyroelectric material, arranged between a lower electrode and an upper electrode. One of these two electrodes is taken to a constant potential, and forms a reference electrode. The other electrode collects pyroelectric charges, generated by the pyroelectric material in response to a variation in temperature. The upper electrode is covered with a protective layer on which the element of which thermal pattern is measured, for example a finger, is intended to be laid during the measurement.

The pyroelectric material may be for example a poly (vinylidene fluoride-trifluoroethylene) or P(VDF-TrFE) or PVDF (polyvinylidene fluoride), a ceramic such as PZT (lead zirconate titanate), AlN, $BaTiO_3$ or ZnO. Other pyroelectric materials are possible, namely all those that produce electrical charges as a function of a pyroelectric parameter.

In the case of an active thermal sensor, the sensor is also provided with a heating element generally produced from the same electrically conductive layer as that serving to produce the upper electrode. This heating element is for example produced in the form of a coil partially surrounding the upper electrodes and making it possible to heat laterally the pyroelectric capacitances, at the level of the upper electrodes.

Each pyroelectric capacitance forms a transducer which translates a temporal variation in temperature into an electrical signal such as a difference in electrical potentials.

When the sensor has to have a large surface and be produced at a low cost, it is advantageously produced using so-called printed technology, or by printing, less expensive than lithography on semiconductor. Different portions of materials forming the elements of the pixels of the sensor may in this case be produced with inks that are sufficiently stable so as not to require high performance encapsulation. The production of at least one part of the elements of the sensor may be envisaged by printing, for example on simple plastic substrates.

In such a sensor produced by deposition by printing, the printed pyroelectric material has several defects inherent to the printing techniques such as a certain porosity and edge effects generating significant leakage currents, between the electrodes of the capacitances, which can prevent the correct operation of the sensor. For example, for sensors including pyroelectric capacitances formed of stacks of Au/PVDF/Pedot or Au/PVDF/Ag type, the leakage currents are of the order of 1 µA, which is too high given that the pyroelectric currents obtained during measurements are of the order of a nA. Such a leakage current is obtained on account of the considerable porosities formed in the PVDF. For example, in a layer of PVDF deposited by screen printing and having undergone an annealing at 135° C. for 20 minutes, the diameter of the porosities is of the order of 5 µm. Moreover, this leakage current greatly penalises the step of polarization of the pyroelectric material that has to be implemented.

Moreover, it may happen, depending on the conditions of the method forming the sensor and/or the environment of the room in which the sensor is produced, that dust is deposited during the production of the sensor, which can create holes in the pyroelectric material and thereby increase the risk of leakage between the electrodes of the sensor.

DESCRIPTION OF THE INVENTION

There thus exists a need to propose a thermal pattern sensor in which leakage currents are reduced, notably when at least one part of the elements of this sensor are produced by printing.

To do so, a thermal pattern sensor comprising several pixels arranged on a substrate is proposed, each pixel including at least one pyroelectric capacitance formed by at least one portion of pyroelectric material arranged between at least one lower electrode and at least one upper electrode, with the lower electrode arranged between the substrate and the portion of pyroelectric material, and in which at least one protective dielectric layer is arranged between the portion of pyroelectric material and the upper electrode.

This thermal pattern sensor is provided with a protective layer interposed between the portion of pyroelectric material and the upper electrode. Thus, the material of the protective layer fills the porosities of the pyroelectric material or the holes present in the pyroelectric material, which makes it possible to greatly reduce leakage currents within the sensor, and thereby improve the polarization of the pyroelectric material.

Indeed, in a device having significant leakage currents, during the polarization of the pyroelectric material, a breakdown of the pyroelectric material layer may take place on account of fragile zones of the pyroelectric material. These fragile zones correspond to the zones where porosities and/or holes formed by dust are present, leading these zones to have an actual thickness that is much lower than the zones without porosities or holes. Such a breakdown may take place on account of the high voltages used for the polarization (of the order of 150 V per micron thickness of pyroelectric material in the case of PVDF) because with such voltages, the current will be higher in the zones of lower thickness (Ohm's law).

In addition, even in the case of layers of pyroelectric material which do not break down during polarization, the pyroelectric current generated when the sensor is subjected to a difference in temperature is not symmetrical between the heating and the cooling, and the values of this current are very dispersed and non-coherent. With the material of the protective layer arranged between the portion of pyroelectric material and the upper electrode, the values of the current generated by the sensor are much less dispersed and more coherent.

The addition of the protective layer thus makes it possible to obtain functional and reproducible sensors.

Moreover, the material of the protective layer is dielectric in order to guarantee a good electrical insulation between the lower and upper electrodes despite the presence of porosities and/or holes in the pyroelectric material.

The pyroelectric material may be porous.

The protective dielectric layer comprises at least one of the following materials: self-assembled molecular monolayer (for example in alcohol or water), dielectric material soluble in a solvent orthogonal to the pyroelectric material (for example soluble in water). Such dielectric materials do not have any pyroelectric property, nor porosities or holes (unlike PVDF-based materials deposited by printing).

The pyroelectric material may be a non-cross-linkable organic material, for example a copolymer such as P(VDF-TrFE) and/or PVDF, and/or for example AlN and/or PZT.

A solvent orthogonal to the material corresponds to a solvent that does not dissolve, that is to say which does not solubilise, this material with which the solvent is in contact. For example, when the pyroelectric material corresponds to PVDF-TrFE, the solvent used does not correspond to cyclopentanone, butyrolactone or a ketone type solvent because such solvents can deteriorate or damage the pyroelectric material.

The thickness of the protective dielectric layer may be between around 10 nm and 500 nm. With such a thickness, the protective dielectric layer does not impact the heat transfer taking place in the pixels of the sensor during a measurement of a thermal pattern.

The thermal pattern sensor may be such that:
the substrate is a flexible substrate including at least one plastic material, and/or
the lower and upper electrodes comprise at least one of the following materials: silver, gold, copper, nickel, carbon, conductive polymer.

Such materials are suited for the at least partial production of the thermal pattern sensor by printing.

The material of the protective dielectric layer may comprise nanoparticles of inorganic dielectric material. The presence of such nanoparticles makes it possible to reduce the voltage, and thus the electric field, to apply to the terminals of the pyroelectric capacitances during the polarization of the pyroelectric material.

In particular, the nanoparticles may have diameters less than or equal to around 50 nm, and/or the inorganic dielectric material of the nanoparticles may be a pyroelectric material, and/or the proportion by weight of the nanoparticles in the protective dielectric layer is less than or equal to around 6%. Such properties of the nanoparticles make it possible to ensure a good equilibrium between the reduction in the level of voltage to apply to the terminals of the pyroelectric capacitances during the polarization of the pyroelectric material, and the level of leakage currents within the pyroelectric capacitances.

Each pixel may comprise at least one heating element arranged under a front face of the thermal pattern sensor. The presence of such a heating element signifies that the thermal pattern sensor is of active type.

Moreover, the thermal pattern sensor may be a finger print sensor.

A method for producing a thermal pattern sensor comprising several pixels is also proposed, in which each pixel comprises at least one pyroelectric capacitance produced by the implementation of the following steps:
producing at least one lower electrode on a substrate;
producing at least one portion of pyroelectric material at least on the lower electrode;
producing at least one protective dielectric layer on the portion of pyroelectric material;
producing at least one upper electrode on the protective dielectric layer.

Apart from the advantages mentioned previously in relation with the structure of the thermal pattern sensor, the presence of the dielectric layer during the production of the sensor makes it possible to protect the portion of pyroelectric material during the production of the upper electrode.

The lower electrode and/or the upper electrode and/or the portion of pyroelectric material may be produced by depositions by printing, such as for example by screen printing, photogravure, ink jet, flexography, or by offset etching.

The protective dielectric layer may be produced by deposition by liquid process with at least one of the following solvents: butyl acetate, propyl acetate, isopropanol, ethanol, methoxy ethanol, ethoxy ethanol, hexane, cyclohexane, water. With such solvents, the pyroelectric material on which the protective dielectric layer is produced is not degraded.

The protective dielectric layer may be produced by at least one deposition by printing or by at least one vacuum deposition.

The method may further comprise the production, for each pixel, of at least one heating element arranged under a front face of the thermal pattern sensor.

BRIEF DESCRIPTION OF THE DRAWINGS

The present invention will be better understood on reading the description of exemplary embodiments given purely for illustrative purposes and in no way limiting while referring to the appended drawings in which.

Identical, similar or equivalent parts of the different figures described hereafter bear the same numerical references in order to make it easier to go from one figure to the next.

The different parts shown in the figures are not necessarily according to a uniform scale, in order to make the figures more legible.

The different possibilities (alternatives and embodiments) should be understood as not being mutually exclusive and may be combined together.

DETAILED DESCRIPTION OF PARTICULAR EMBODIMENTS

Figure 1:
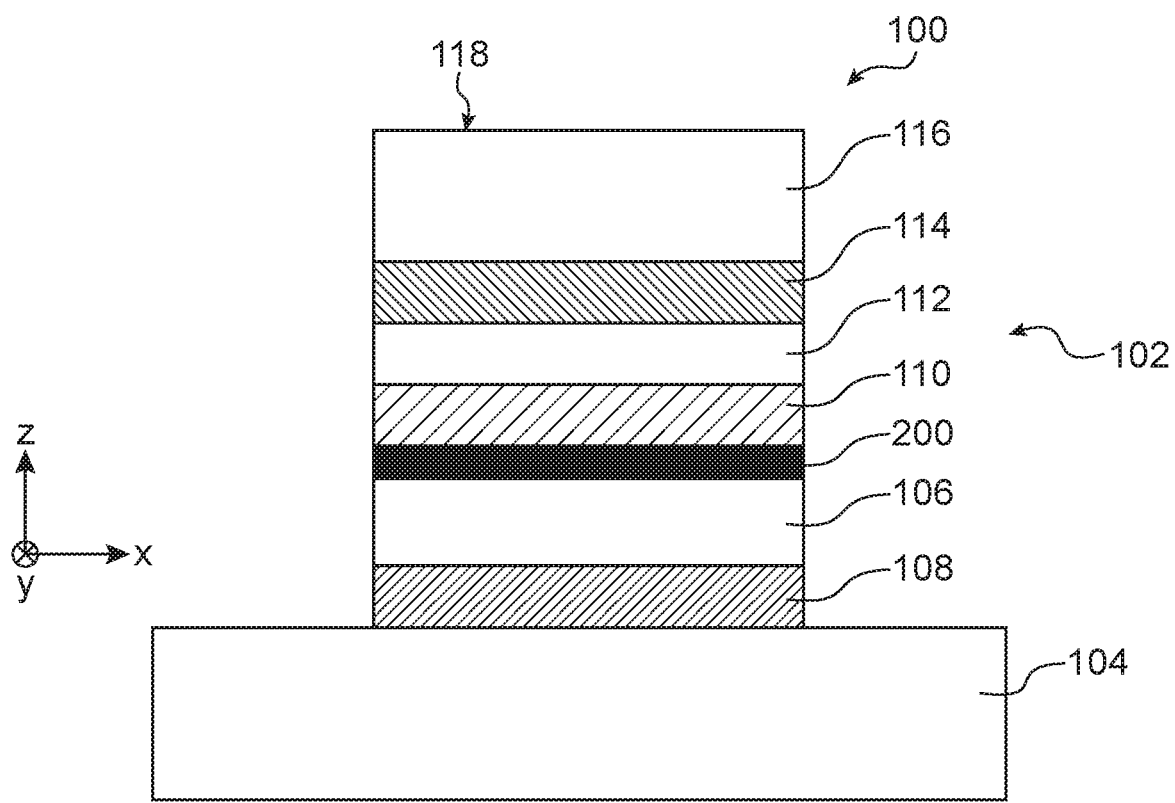
FIG. 1 shows, schematically, a sectional view of a pixel of a thermal pattern sensor, according to a particular embodiment.

Reference is firstly made to FIG. 1 which shows a sectional view of a pixel 102 of a thermal pattern sensor 100 according to a particular embodiment.

The pixel 102 is produced on a substrate 104. The substrate 104 is here a flexible substrate comprising a plastic material, including for example polyimide and/or PEN (poly(ethylene naphthalate)) and/or PET (poly(ethylene terephthalate)), on which the different elements of the sensor 100 (pyroelectric capacitances of the pixels 102, TFT (thin film transistors) in the case of a sensor 100 with an active matrix, etc.), are produced using printed technology.

The thickness of the substrate 104 (dimension along the Z axis shown in FIG. 1) is for example equal to around 125 µm or more generally between around 50 µm and 250 µm.

A single pixel 102 is shown in FIG. 1, for greater legibility, but the thermal pattern sensor 100 comprises a plurality of pixels 102 produced on the substrate 104. The pixels 102 of the thermal pattern sensor 100 are here arranged by forming a matrix of several lines and several columns of pixels 102. The pitch of the pixels 102 (distance between the centres of two neighbouring pixels 102), in the plane (X,Y) (that is to say the plane of the substrate 104), is for example between around 50 µm and several centimetres. In the case of a sensor of resolution equal to 500 dpi (dots per inch), the pitch of the pixels 102 is equal to 50.8 µm.

Each of the pixels 102 of the thermal pattern sensor 100 comprises thermal measurement, or detection, means formed by a pyroelectric capacitance.

Each pyroelectric capacitance comprises a portion of pyroelectric material 106 arranged between a lower electrode 108 and an upper electrode 110.

The pyroelectric material of the portion 106 is here a copolymer, advantageously P(VDF-TrFE) and/or PVDF. In an alternative, the portion 106 may comprise AlN and/or PZT and/or any other pyroelectric material suited to form a pyroelectric capacitance. The thickness of the portion 106 (dimension along the Z axis shown in FIG. 1) is for example equal to around 3 µm, and for example between around 2 and 10 µm. Generally speaking, the pyroelectric material of the portion 106 is an organic material which, using printed technology, is non-cross-linkable.

The lower electrode 108 and the upper electrode 110 each comprise at least one electrically conductive material. The electrodes 108, 110 may comprise silver, gold, copper, nickel, carbon or a conductive polymer such as PEDOT:PSS (poly(3,4-ethylenedioxythiophene). The thickness of each of the electrodes 108, 110 is for example between around 0.01 µm and 1 µm. The thickness of each of the electrodes 108, 110 may be greater and be between around 0.01 µm and 3 µm. The thickness of the electrodes 108, 110 is preferably the smallest possible so as not to perturb the depositions of the other layers. For example, for the electrodes 108, 110 including metal such as Au and/or Cu, deposited by evaporation, the thickness of each of the electrodes 108, 110 is advantageously of the order of 50 nm. In the case of electrodes formed by printing, this thickness is for example between around 500 nm and 1 µm.

The upper electrode 110 and/or the lower electrode 108 are produced for example in the form of metal lines parallel with each other. Thus, the lower electrodes 108 and/or the upper electrodes 110 are for example produced in the form of lines each having a width equal to around 40 µm and spaced apart from each other by a distance equal to around 40 µm.

One of the upper and lower electrodes 108, 110, here the upper electrode 110, is intended to be connected to a reference electrical potential and also serves as ground plane in the sensor 100. The other electrode, that is to say here the lower electrode 108, is intended to receive the electrical charges generated during the measurement of the thermal pattern by the sensor 100.

A protective layer 200 is arranged within the pyroelectric capacitances of the pixels 102. This protective layer 200 corresponds to a dielectric material layer filled or not with nanoparticles, making it possible to fill up the porosities or holes of the pyroelectric material of the portion 106. On account of the porosities or holes within the pyroelectric material, and in order to avoid the creation of a short-circuit between the electrodes 108 and 110, the material of the protective layer 200 is dielectric.

The protective layer 200 may be produced with at least one of the following materials:
- fluoropolymer, such as for example Cytop® sold by the AGC® Company;
- self-assembled molecular monolayer, also called SAM or self-assembled monolayer, in alcohol or water;
- dielectric material soluble in water such as PVP (poly-4-vinylphenol);
- dielectric material present in a solvent orthogonal to the material of the portion 106, such as for example polystyrene or PMMA or polycyclohexane.

The pyroelectric material used to form the portion 106, such as for example PVDF, is an organic material which is not cross-linkable and which, when it is produced by printing, does not withstand the deposition of certain solvents thereon. Thus, so as not to degrade the pyroelectric material of the portion 106 when said pyroelectric material is not cross-linkable, the protective layer 200 may be produced with at least one of the following solvents or a mixture of several of these solvents: butyl acetate, propyl acetate, isopropanol, ethanol, methoxy ethanol, ethoxy ethanol, hexane, cyclohexane, water.

Figure 2A:
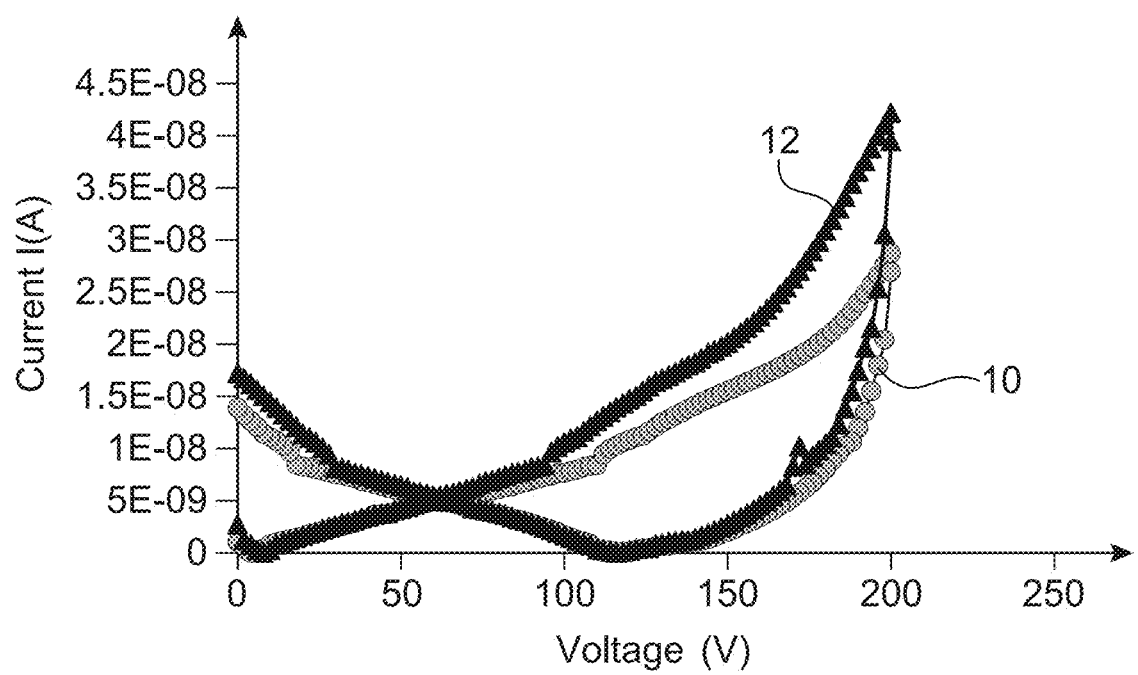
FIGS. 2A and 2B show the leakage current in a pixel of a thermal pattern sensor according to a particular embodiment.

FIG. 2A shows the leakage currents obtained during the polarization of the pyroelectric capacitance of the pixel 102 described above. The curve 10 corresponds to the leakage current obtained in the presence of a protective layer 200 of thickness equal to 300 nm and including PMMA present initially in butyl acetate. The curve 12 corresponds to the leakage current obtained in the presence of a protective layer 200 of thickness equal to 100 nm and comprising polystyrene present initially in butyl acetate. The curves 10 and 12 are obtained for a pyroelectric capacitance of surface area equal to around 10 mm².

Figure 2B:
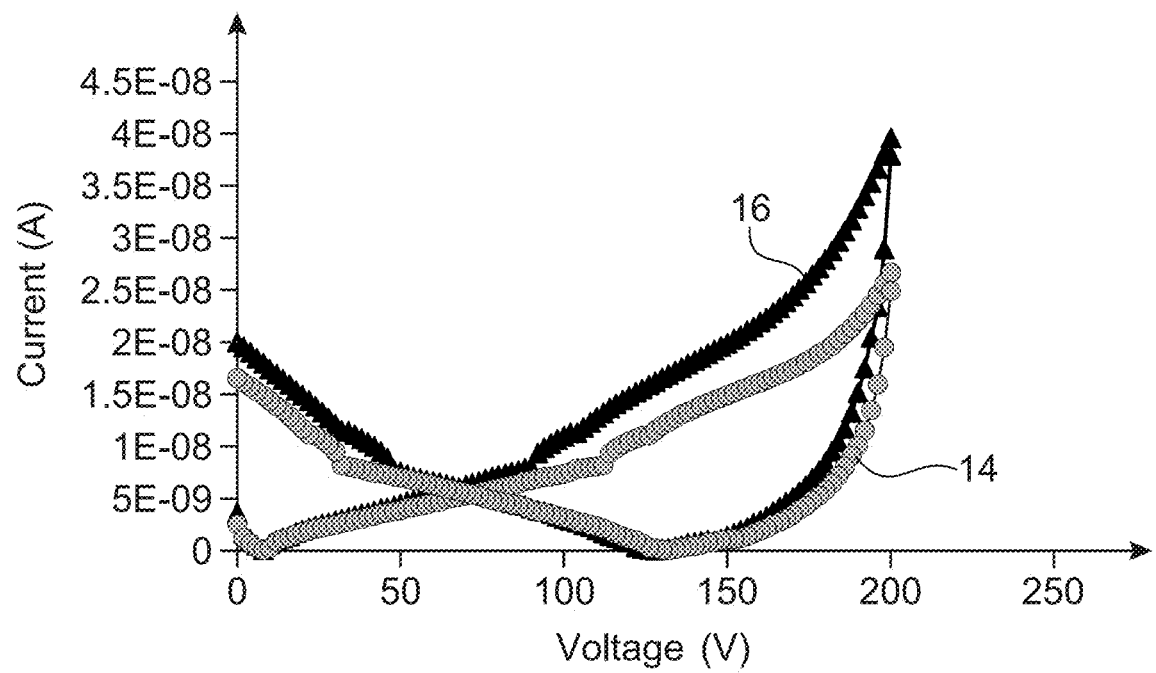

FIG. 2B shows the leakage currents obtained during the polarization of the pyroelectric capacitance of the pixel 102 described above. The curve 14 corresponds to the leakage current obtained in the presence of a protective layer 200 of thickness equal to 300 nm and including PMMA present initially in butyl acetate. The curve 16 corresponds to the leakage current obtained in the presence of a protective layer 200 of thickness equal to 100 nm and comprising polystyrene present initially in butyl acetate. The curves 14 and 16 are obtained for a pyroelectric capacitance of surface area equal to around 30 mm².

The thickness of the protective layer 200 is chosen such that it is sufficient to minimise the leakage current within the pyroelectric capacitance, while ensuring that the pyroelectric material of the portion 106 conserves its pyroelectric character and that the heat transfer within the pixel 102 is perturbed the least possible. To do so, the thickness of the protective layer 200 is here less than around 500 nm, for example between around 50 nm and 400 nm, and advantageously between around 100 nm and 300 nm, and further advantageously of the order of 100 nm. This thickness may also be chosen such that the impact of this protective layer 200 on the hysteresis cycle of the pyroelectric material of the portion 106 is minimum. For example, for a protective layer 200 including PMMA present initially in butyl acetate and arranged on a portion of PVDF, the thickness of the protective layer 200 is advantageously less than or equal to around 370 nm.

According to an advantageous embodiment, the protective layer 200 also comprises nanoparticles of inorganic dielectric material. The diameters of these nanoparticles are for example less than or equal to around 50 nm. The addition of such nanoparticles integrated within the material of the protective layer 200 makes it possible to reduce the voltage, and thus the electric field, to apply to the terminals of the pyroelectric material of the portion 106 to polarize it. Such nanoparticles comprise for example a metal oxide such as $Al_2O_3$ and/or $TiO_2$. Advantageously, the material of these nanoparticles also has pyroelectric properties, such as for example nanoparticles of $BaTiO_3$. In order that the protective layer 200 makes it possible to reduce the leakage currents, the percentage, in terms of weight, of nanoparticles present in the material of the protective layer 200 is preferably less than or equal to around 6%.

The upper electrode 110 is covered by a dielectric layer 112. The thickness of the dielectric layer 112 ranges for example from 0.1 µm to 5 µm. The dielectric layer 112 is, for example, made of polyimide.

In the embodiment where the thermal pattern sensor 100 is suited to carrying out an active thermal detection, in addition to the elements described previously, the sensor 100 also comprises heating elements 114 dissipating a certain amount of heat in the pixels 102, and notably in the pyroelectric material of the portion 106. The material(s) serving for the production of the heating element 114 of each pixel 102 may be similar to those mentioned previously for the production of the electrodes 108, 110. The heating elements 114 are, for example, produced in the form of metal lines parallel with each other.

In an alternative, the heating elements of the sensor 100 may be for example formed of electrically conductive portions from the same layer as that serving for the production of the upper electrodes 110 or the lower electrodes 108.

The heating elements 114 have, for example, a thickness ranging from 0.5 µm to 10 µm, or from 0.03 µm to 10 µm, and preferably ranging from 1 µm to 5 µm.

Each of the heating elements 114 forms a resistive metal element (electrical resistance for example between around 10Ω and 100Ω) associated with a pixel 102 and which makes it possible to heat this pixel 102. The heating elements 114 make it possible, during a detection implemented by the sensor 100, to dissipate a certain amount of heat in the pixels 102, and notably in the pyroelectric material of the portion 106. In each pixel 102, the heating of the portion 106 of pyroelectric material is obtained by making a current circulate in the heating element 114 forming the heating resistance of each of the pixels 102. In order to obtain good detection sensitivity, reflecting a strong difference in temperatures between a pixel in contact with a ridge of the print and a pixel in contact with a valley of the print, the electric power injected by the heating elements 114 may range from 0.5 mW/pixel to 5 mW/pixel in the case of pixels having sides of dimension equal to around 50 µm (as is the case for a standard finger print sensor of resolution equal to 500 dpi).

The heating elements 114 and the parts of the dielectric layer 112 on which the heating elements 114 are not arranged are, advantageously, covered by an encapsulation layer 116, corresponding for example to a laminated layer of PET or any other material suited to the production of this layer 116. Other materials may be envisaged for this layer 116, such as for example polyimide, PVDF and/or copolymers thereof, PMMA, etc. The material(s) used and the thickness of the layer 116 are chosen to obtain good transfer of heat from a front face 118 of the sensor 100 to the pyroelectric capacitances of the pixels 102. Thus, the encapsulation layer 116 is produced such that it is neither too thermally resistive (because heat would not pass through it), nor too thermally conductive (because heat would in this case leave from the sides, to the other pixels, causing diathermy within the sensor 100), nor too thick (to have a heat transfer that takes place from the front face 118 of the sensor 100 to the pyroelectric capacitance), nor too thin (the thickness of the layer 116 must all the same be sufficient in order to fulfil its protective role). The thickness of the encapsulation layer 116 may range from around 1 micron to around 5 µm, and is for example of the order of 3 µm. Alternatively, the encapsulation layer 116 may correspond to a layer of DLC (diamond like carbon) of thickness less than around 1 µm.

The upper face of the encapsulation layer 116 corresponds to the surface on which the thermal pattern intended to be detected is located, for example a finger of which the print is intended to be detected.

According to an advantageous configuration of the sensor 100, the lower electrodes 108 are produced in the form of conductive lines parallel with each other and oriented along a first direction, the upper electrodes 110 are produced in the form of a conductive layer also serving as ground plane, and the heating elements 114 are produced in the form of conductive lines parallel with each other and oriented along a second direction substantially perpendicular to the first direction. Seen from above, the intersections between the lines forming the lower electrodes 108 and those forming the heating elements 114 correspond to the pixels 102, that is to say to the detection zones by the pyroelectric material of the portions 106.

The table below gives an advantageous exemplary embodiment of a pixel 102 of the thermal pattern sensor 100.

| MATERIAL | | THICKNESS |
|---|---|---|
| Encapsulation layer 116 | PET | Between 3 μm and 10 μm |
| | Material know as LOCTITE NCI 9001 E&C sold by the HENKEL ® Company | 3.7 μm |
| Heating element 114 | Ag | 1 μm |
| Dielectric layer 112 | Polyimide | Between 0.2 μm and 1 μm |
| Upper electrode 110 | PEDOT:PSS or Ag | 0.6 μm |
| Protective layer 200 | Polystyrene, poly(vinyl cyclohexane) | 100 nm |
| Pyroelectric portion 106 | PVDF-TrFE | Between 2 μm and 3 μm |
| Lower electrode 108 | Au | 0.03 μm |
| Substrate 104 | PEN | 125 μm |

The thermal pattern sensor 100 described above corresponds to a sensor produced using printed technology, that is to say in which at least one part of the different elements arranged on the substrate 104 are deposited by the implementation of printing techniques: screen printing, photogravure, ink jet, flexography, or offset etching, and resorting to inks compatible with these deposition techniques. However, the addition of the protective layer 200 between the portion of pyroelectric material 106 and the upper electrodes 110 is also possible within a thermal pattern sensor 100 produced by the implementation of microelectronic techniques, that is to say by deposition, photolithography and etching.

An example of method for manufacturing the thermal pattern sensor 100 is described below.

The sensor is produced from the substrate 104. The material of the substrate 104 (glass, semiconductor, plastic, etc.) is chosen according to the technology with which the different elements of the sensor 100 are produced. The substrate 104 is firstly cleaned in order to eliminate the organic residues present thereon. The type of cleaning implemented is a function of the material of the substrate 104.

The second step consists in forming on the front face 118 of the substrate 104 the lower electrodes 108 by printing an electrically conductive ink (for example screen printing, spraying or by ink jet). In an alternative, the lower electrodes 108 may be formed by a deposition of a first electrically conductive layer, for example metal, from which the lower electrodes 108 are produced by photolithography and etching of this first layer. For example, for the production of lower electrodes 108 comprising gold, these lower electrodes 108 are formed by carrying out a deposition of a layer of gold having a thickness for example equal to around 30 nm, this layer next being subjected to a photolithography then etched to form the lower electrodes 108.

The pyroelectric material forming the portions 106 is next deposited by printing on the lower electrodes 108. In non-printed technology, the portions 106 are defined by the implementation of a photolithography and an etching of a layer of pyroelectric material. When the etching implemented corresponds to a plasma etching, an $O_2$ plasma may be used alone or in combination with $SF_6$ (sulphur hexafluoride). The portions of pyroelectric material conserved after the implementation of this etching correspond to the portions 106 of the pyroelectric material localised at the pixels 102 of the sensor 100.

The protective layer 200 is next deposited, notably covering the portions 106 of pyroelectric material. This deposition may be obtained either by printing a liquid ink, for example polymer based, or by vacuum deposition such as an ALD (atomic layer deposition) or PVD (physical vapour deposition) type deposition from an inorganic dielectric material such as for example a metal oxide or a material such as $SiO_2$.

The upper electrodes 110 are next deposited, for example by printing, as described previously.

The thermal pattern sensor 100 is finished by depositing successively the dielectric layer 112, the heating elements 114 and the encapsulation layer 116. The heating elements 114 may be produced in the form of coils or rectangular lines. When the material of the encapsulation layer 116 is deposited in a localised manner, such as for example by spraying or by ink jet, the encapsulation layer 116 is formed as of the deposition in a localised manner on the heating elements 114 and the potential parts of pyroelectric material not covered by the heating elements 114.

In the different examples described previously, the thermal pattern sensor 100 is used as a finger print detector. However, the sensor 100 may be used to form a palm print sensor, notably when the sensor 100 has significant dimensions and is produced by printing on a flexible substrate. The sensor 100 may also be suited to carrying out a detection of thermal patterns other than finger prints, due to the fact that each pixel 102 of the sensor 100 reads the calorific capacitance placed above it and does so whatever the nature of the thermal pattern.

Moreover, the insertion of the protective layer 200 in the pyroelectric capacitances of the sensor 100 applies as much to an active thermal pattern sensor 100 as to a thermal pattern sensor of passive type which can also be produced by printing.

In addition, the thermal pattern sensor 100 may also serve to produce an uncooled infrared imager. The pixels 102 of the sensor 100 are in this case integrated on an integrated circuit of CCD or CMOS type collecting the electrical charges generated by the sensor. Such an imager further comprises an infrared lens filtering the light arriving on the sensor. In order that the sensor 100 can be subjected to a difference in temperature (necessary given the measurement carried out by the pyroelectric capacitances), the imager comprises a device making it possible to successively block the infrared light arriving on the sensor then to allow this light to get through. Such a device may correspond to a "chopper", that is to say a wheel provided with a hole and turning in front of the sensor. An absorber element may be added to the pyroelectric material in order to improve the absorption of the infrared radiation received.

What is claimed is:

1. A thermal pattern sensor comprising several pixels arranged on a substrate, each pixel including at least one pyroelectric capacitance formed by at least one portion of pyroelectric material arranged between at least one lower electrode and at least one upper electrode, the at least one portion of pyroelectric material comprising a plurality of porosities and/or holes, with the lower electrode arranged between the substrate and the portion of pyroelectric material, in which at least one protective dielectric layer is arranged between the portion of pyroelectric material and the upper electrode, wherein the at least one protective dielectric layer fills the plurality of porosities and/or holes, and comprises at least one of the following materials: self-assembled molecular monolayer, or dielectric material soluble in a solvent orthogonal to the pyroelectric material.

2. The thermal pattern sensor according to claim 1, in which the pyroelectric material is a non-cross-linkable organic material.

3. The thermal pattern sensor according to claim 1, in which the thickness of the protective dielectric layer is between around 10 nm and 500 nm.

4. The thermal pattern sensor according to claim 1, in which the substrate is a flexible substrate including at least one plastic material.

5. The thermal pattern sensor according to claim 1, in which the lower and upper electrodes comprise at least one of the following materials: silver, gold, copper, nickel, carbon, or conductive polymer.

6. The thermal pattern sensor according to claim 1, in which the material of the protective dielectric layer comprises nanoparticles of inorganic dielectric material.

7. The thermal pattern sensor according to claim 6, having at least one of the following properties:
   the nanoparticles have diameters less than or equal to around 50 nm,
   the inorganic dielectric material of the nanoparticles is a pyroelectric material, or
   the proportion by weight of nanoparticles in the protective dielectric layer is less than or equal to around 6%.

8. The thermal pattern sensor according to claim 1, in which each pixel comprises at least one heating element arranged under a front face of the thermal pattern sensor.

9. The thermal pattern sensor according to claim 1, in which said thermal pattern sensor is a finger print sensor.

10. A method for producing a thermal pattern sensor comprising several pixels, in which each pixel comprises at least one pyroelectric capacitance produced by the implementation of the following steps:
    producing at least one lower electrode on a substrate;
    producing at least one portion of pyroelectric material at least on the lower electrode, the at least one portion of pyroelectric material comprising a plurality of porosities and/or holes;
    producing at least one protective dielectric layer on the portion of pyroelectric material; and
    producing at least one upper electrode on the protective dielectric layer,
    wherein the at least one protective dielectric layer fills the plurality of porosities and/or holes, and
    wherein the protective dielectric layer comprises at least one of the following materials: self-assembled molecular monolayer, or dielectric material soluble in a solvent orthogonal to the pyroelectric material.

11. The method according to claim 10, in which the lower electrode and/or the upper electrode and/or the portion of pyroelectric material are produced by depositions by printing.

12. The method according to claim 10, in which the protective dielectric layer is produced by deposition by liquid process with at least one of the following solvents: butyl acetate, propyl acetate, isopropanol, ethanol, methoxy ethanol, ethoxy ethanol, hexane, cyclohexane, or water.

13. The method according to claim 10, in which the protective dielectric layer is produced by at least one deposition by printing or by at least one vacuum deposition.

14. The method according to claim 10, further comprising the production, for each pixel, of at least one heating element arranged under a front face of the thermal pattern sensor.

15. The method according to claim 10, in which said thermal pattern sensor is a finger print sensor.

* * * * *